(12) United States Patent
Itoh

(10) Patent No.: US 7,580,603 B2
(45) Date of Patent: Aug. 25, 2009

(54) ILLUMINATION DEVICE, DISPLAY DEVICE, AND PROJECTION TYPE DISPLAY DEVICE

(75) Inventor: Yoshitaka Itoh, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 792 days.

(21) Appl. No.: 11/042,443

(22) Filed: Jan. 26, 2005

(65) Prior Publication Data

US 2005/0169572 A1   Aug. 4, 2005

(30) Foreign Application Priority Data

Jan. 30, 2004  (JP) .............................. 2004-023870
Oct. 25, 2004  (JP) .............................. 2004-309284

(51) Int. Cl.
  *G02B 6/26* (2006.01)
  *G05D 25/00* (2006.01)
  *F21V 5/00* (2006.01)

(52) U.S. Cl. .......................... 385/38; 359/739; 362/552; 362/559

(58) Field of Classification Search ................... 385/38; 359/739; 362/552, 559
See application file for complete search history.

(56) References Cited

U.S. PATENT DOCUMENTS 6,714,362 B2 *  3/2004  Nomura et al. ............. 359/739
7,131,736 B2 * 11/2006  Bierhuizen ................... 353/98

FOREIGN PATENT DOCUMENTS

JP   2001-296841   10/2001
JP   A-2003-98483   4/2003
JP   2004-004463    1/2004
JP   2004-004613    1/2004

OTHER PUBLICATIONS

T. Kurita "Display System of Hold Type Display and Picture Quality Upon Displaying Motion Picture," *Proceedings of the First LCD Forum*, pp. 1-20, Aug. 1998.

* cited by examiner

*Primary Examiner*—Jerry T Rahll
(74) *Attorney, Agent, or Firm*—Oliff & Berridge, PLC

(57) ABSTRACT

Aspects of the invention can provide an illumination device capable of preventing or reducing a reduction in efficiency of utilization of lights emitted from the light source, and also suitable to display high-quality moving images, and a display device and a projection type display device using this illumination device. The illumination device can include a light source to emit lights, a homogeneous light guiding device for making intensity distributions of incident lights homogeneous, a reflecting device, disposed on a light incident end face side of the homogeneous light guiding device and provided with an aperture to allow the lights to come incident, for reflecting lights to an inside of the homogenous light guiding device in a region other than the aperture, a reflection variable diaphragm device, disposed on a light exiting end face side of the homogenous light guiding device, for forming a variable aperture in which an area of an aperture region varies and, in a region other than the aperture region, reflecting the lights to the inside of the homogeneous light guiding device, a light scanning device for scanning lights emitted from the reflection variable diaphragm device on a subject to be illuminated.

19 Claims, 10 Drawing Sheets

ILLUMINATION DEVICE, DISPLAY DEVICE, AND PROJECTION TYPE DISPLAY DEVICE

BACKGROUND

1. Field of Invention

Aspects of the invention relate to an illumination device, a display device, and a projection type display device.

2. Description of Related Art

A related art liquid crystal display element, such as a liquid crystal panel and a liquid crystal light valve, can be used as a light modulation device in a direct-view type display device or a projection type display device. The liquid crystal display element is a so-called hold type display element that modulates intensity by controlling a quantity of transmitted lights per unit time. "Blurring" can be perceived in an edge portion of an image when moving images are displayed, and measures to improve this drawback are being discussed. See, for example, Taiichiro Kurita, "Hourudo-gata disupurei no hyouji houshiki to douga hyouji niokeru gashitsu" *Proceedings of the First LCD Forum*, the Japanese Liquid Crystal Society, August 1998, pp. 1-6.

To improve the quality of moving images in the liquid crystal display element, which is a hold type display element, adopting two techniques as follows is thought to be effective: (1) to improve a display characteristic of the liquid crystal display element itself, for example, by increasing a response speed of the display element through modifications of liquid crystal materials or technical devices in a driving circuit; and (2) to improve an illumination method of illuminating the liquid crystal display element, for example, by switching ON/OFF the illumination lights intermittently on time base and thereby shortening a display time.

Improvements of the image quality of moving images for the liquid crystal display device are proceeding with the focus on the modifications of liquid crystal materials or technical devices in the driving circuit. However, these efforts alone are not enough, and improvements of the illumination device and the illumination method need to be discussed actively, too. Because a discharge lamp widely used as a light source in the direct-view type display device or the projection type display device is not suitable for intermittent ON/OFF operations, there has been discussed an optical system that can achieve intermittent illumination by a disposing device of some kind for controlling illumination lights on the illumination optical path. See, for example, JP-A-2001-296841.

SUMMARY OF THE INVENTION

JP-A-2001-296841 discloses an illumination device to intermittently illuminate a liquid crystal display element, which is a subjected to be illuminated, by rotating a slit plate provided with plural apertures in the circumferential direction on the illumination optical path, and an illumination device to intermittently illuminate (illuminate by scanning) a liquid crystal display device by previously generating band-like illumination lights and then by rotating a prism mirror to scan the band-like illumination lights.

The illumination device described above is able to improve the quality of moving images, but a time to illuminate the liquid crystal display element becomes shorter, which raises a problem that brightness of an image being displayed is lowered.

Also, for the illumination device using the prism mirror, theoretically, there will be no loss in brightness. However, in actual, the occurrence of a loss of lights during the process of generating band-like illumination lights is unavoidable, and brightness of an image to be displayed is lowered.

Because effects from the improvements of the quality of moving images relate to a width of the band-like illumination lights described above, it is possible to minimize a drop in brightness of an image being displayed while maintaining the effects from the improvements of the quality of moving images by optimizing the width of the band-like illumination lights according to a degree of motion of moving images being displayed. However, the illumination device described above forms the band-like illumination lights by shielding illumination lights emitted from the light source by a slit plate having a fixed shape. This raises a problem that considerable lights are lost constantly and only dark images are displayed regardless of a degree of motion of moving images being displayed.

An aspect of the invention can provide an illumination device not only capable of reducing or preventing a reduction in efficiency of utilization of lights emitted from the light source, but also suitable to display high-quality moving images, and a display device and a projection type display device using this illumination device.

An exemplary illumination device of the invention can include a light source to emit lights, a homogeneous light guiding device for making intensity distributions of the lights emitted from the light source homogeneous, a reflecting device, disposed on a light incident end face side of the homogeneous light guiding device and provided with an aperture to allow the lights to come inside the homogenous light guiding device, for reflecting lights emitted from the homogenous light guiding device to an inside of the homogenous light guiding device in a region other than the aperture, a reflection variable diaphragm device, disposed on a light exiting end face side of the homogenous light guiding device, for forming a variable aperture in which an area of an aperture region that allows lights to be emitted from the homogeneous light guiding device varies, and, in a region other than the aperture region, reflecting the lights emitted from the homogeneous light guiding device to the inside of the homogeneous light guiding device, and light scanning device for scanning lights emitted from the reflection variable diaphragm device on a subject to be illuminated.

In other words, because the illumination device of the invention can include the reflection variable diaphragm device capable of changing an area of the aperture through which the lights are emitted and the light scanning device, not only is it possible to change the size and the shape of illumination lights to illuminate the subject to be illuminated, but it is also possible to illuminate across the entire surface of the subject to be illuminated almost homogeneously by scanning the illumination lights of the changed shape. A degree of intermittent illumination (a ratio of an illumination time per unit time) to the subject to be illuminated can be thus changed.

Also, for example, in a case where a display element having a hold type display mode, such as a liquid crystal display element, is to be illuminated by the illumination device of the invention, when the liquid crystal display device is to display images in fast motion, a characteristic close to the so-called impulse type display mode can be achieved by changing a degree of intermittent illumination by reducing an aperture area of the variable aperture or by making the variable aperture into a rectangular shape with a narrow width, which enables high-quality moving images to be displayed. Conversely, when images with less motion are to be displayed, a ratio of the illumination time per unit time is increased by increasing the aperture area of the variable aperture, which enables bright images to be displayed.

Because the homogeneous light guiding device is provided with the reflecting device disposed on the light incident end face side and the reflection variable diaphragm device disposed on the light exiting end face side, it is possible to enhance efficiency of illumination of lights emitted from the homogeneous light guiding device. To be more specific, part of the lights that are reflected instead of being emitted through the variable aperture in the reflection variable diaphragm device propagate through the homogeneous light guiding device in the direction to the light incident end face while being reflected, and emitted again toward he light exiting end face by the reflecting device. Of the lights that are reflected by the reflecting device and propagate through the homogenous light guiding device, the lights that come incident on the variable aperture are emitted toward the subject to be illuminated, whereas the lights that come incident on regions other than the variable aperture are reflected again in the direction to the reflecting device, and thereby repeat the cycles described above. Hence, lights that come inside the homogeneous light guiding device from the light source are emitted toward the subject to be illuminated at a high probability.

To be more specific, it is preferable for the illumination device of the invention that a shape of the light exiting end face of the homogenous light guiding device is similar to a shape of the subject to be illuminated. According to this configuration, because the light exiting end face is almost similar to the subject to be illuminated, in a case where it is set in such a manner that no light from the light exiting end face is shielded by the reflection variable diaphragm device, for example, by disposing a specific optical system between the homogeneous light guiding device and the subject to be illuminated, it is possible to allow the lights emitted from the light emitting end face to go incident on the entire surface of the subject to be illuminated without having to scan the illumination lights. Hence, when set in this manner, deterioration in efficiency of illumination of the illumination device can be prevented.

To be more specific, it is preferable for the illumination device of the invention that an aperture shape of the variable aperture is controlled to be a specific shape, and the light scanning means illuminates the subject to be illuminated without scanning the lights. According to this configuration, for example, when a specific region of the subject to be illuminated is to be illuminated, by controlling the shape of the aperture to be a shape similar to the shape of this specific region, it is possible to illuminate the specific region alone. In this instance, part of the lights that are not emitted through the variable aperture are reflected by the reflection variable diaphragm device and propagate through the homogeneous light guiding device toward the reflecting device. Further, the lights are emitted toward the reflection variable diaphragm device by the reflecting device to be emitted through the variable aperture. It is thus possible to enhance efficiency of utilization of lights emitted from the light source, which in turn makes it possible to illuminate only the specific region of the subject to be illuminated more brightly.

To be more specific, it is preferable for the illuminating device of the invention that the reflection variable diaphragm device includes a pair of light shielding plates disposed to come in close proximity to and to be spaced apart from each other, and a direction in which a width of the lights on the subject to be illuminated is changed by the pair of light shielding plates is substantially a same direction as a scanning direction of the lights on the subject to be illuminated by the light scanning device.

According to this configuration, illumination lights having a desired profile on the subject to be illuminated are changed in width in the light scanning direction, but remains the same in width in a direction that intersects with the light scanning direction at right angles. Hence, for example, in a case where a display element having the hold type display mode, such as a liquid crystal display element, is to be illuminated by the illumination device of the invention, when the liquid crystal display device is to display images in fast motion, a characteristic close to the so-called impulse type display mode can be achieved by scanning illumination lights whose width in the scanning direction is narrowed by bringing the pair of light shielding plates in close proximity to each other. Conversely, when images with less motion are to be displayed, a ratio of the illumination time per unit time is increased by scanning illumination lights whose width in the scanning direction is widened by spacing the pair of light shielding plates apart from each other, which enables bright images to be displayed.

To be more specific, it is preferable for the illumination device of the invention that the light scanning means includes a rotating prism to scan the lights by changing a position of an optical path through its own rotations. According to this configuration, by rotating the rotating prism, it can be possible to illuminate a region where illumination lights are irradiated at homogenous illuminance by scanning illumination lights emitted from the homogeneous light guiding device on the subject to be illuminated. When illumination lights are scanned by the rotating prism, the illumination lights are scanned on the subject to be illuminated in one direction in correspondence with rotations of the rotating prism in one direction. Also, because a speed of lights scanned on the subject to be illuminated can be readily controlled with the rotating speed of the rotating prism, illuminance distributions more homogeneous than by a method of scanning reflection lights by oscillating the mirror from right to left and vice versa, for example, like a galvanometer mirror, can be readily obtained.

To be more specific, it is preferable for the illumination device of the invention that the reflection variable diaphragm device includes two pairs of light shielding plates disposed to come in close proximity to and to be spaced apart from each other, directions, in which respective pairs of light shielding plates come in close proximity to and to be spaced apart from each other, intersect with each other almost at right angles, and a direction in which a width of the lights on the subject to be illuminated is changed by the two pairs of light shielding plates is substantially a same direction as a scanning direction of the lights on the subject to be illuminated by the light scanning device.

According to this configuration, illumination lights having a desired profile on the subject to be illuminated are changed in width in two directions intersecting with each other at right angles. Hence, for example, in a case where a display element having the hold type display mode, such as a liquid crystal display element, is to be illuminated by the illumination device of the invention, when the liquid crystal display device is to display images in fast motion, a characteristic closer to the so-called impulse type display mode can be achieved by scanning lights in directions intersecting with each other almost at the right angles by further narrowing the illuminated region by bringing respective pairs of light shielding plates, disposed at two locations, into close proximity to each other, which enables moving images with a higher quality to be displayed.

To be more specific, it is preferable for the illumination device of the invention that the light scanning means includes two rotating prisms to scan the lights by changing a position of an optical path through their own rotations, and rotating axes of the rotating prisms are disposed to intersect with each other almost at right angles. According to this configuration, by rotating the two rotating prisms, it is possible to scan lights emitted from the light source on the subject to be illuminated at least in two directions intersecting with each other almost at right angles. In addition, by controlling the rotations of the rotating prisms independently, it is possible to control scanning of lights in the two directions separately, which enables lights to be scanned two dimensionally, for example, like raster scan.

To be more specific, it is preferable for the illumination device of the invention that the light scanning means is disposed to be inserted into or removed from a path of the lights. According to this configuration, the light scanning device can be inserted into the path of lights when lights emitted from the light source are scanned on the subject to be illuminated, and the light scanning device can be removed from the path of lights when lights are not scanned. Hence, for example, in a case where a display element having the hold type display mode, such as a liquid crystal display element, is to be illuminated by the illumination device of the invention, it is possible to switch between a mode to scan lights in improving the quality of moving images, and a mode not to scan lights in placing emphasis on brightness by inserting or removing the light scanning device, which can broaden the scope of application of the illumination device.

To be more specific, it is preferable for the illumination device of the invention that reflection type polarizing device is provided on the light exiting end face side of the homogeneous light guiding device. According to this configuration, of random polarized lights emitted from the light source, one type of linearly polarized lights from linearly polarized lights that intersect with each other at right angles can be emitted from the reflection type polarizing device, while the other type of linearly polarized lights can be reflected by the reflection type polarizing device. It is thus possible to illuminate the subject to be illuminated by one type of the linearly polarized lights. For example, when the subject to be illuminated is a liquid crystal display element to modulate one type of linearly polarized lights (to control transmittance or reflectance), the liquid crystal display element can be illuminated by only one type of linearly polarized lights that the liquid crystal display element can modulate, and is therefore illuminated efficiently.

To be more specific, it is preferable for the illumination device of the invention that a $\lambda/4$ wave plate is provided between the reflecting device and the reflection variable diaphragm device. According to this configuration, for example, while the other type of linearly polarized lights reflected by the reflection type polarizing device are repetitively reflected between the reflecting device and the reflection variable diaphragm device, their polarization directions are rotated by the $\lambda/4$ wave plate, the reflecting device, and the reflection variable diaphragm device, and are eventually converted to one type of linearly polarized lights. One type of linearly polarized lights thus converted are able to pass through the reflection type polarizing device, and hence to illuminate the subject to be illuminated.

In other words, the other type of linearly polarized lights that are reflected by the reflection type polarizing device and not used to illuminate the subject to be illuminated are converted to one type of linearly polarized lights to be used to illuminate the subject to be illuminated. It is thus possible to illuminate the subject to be illuminated more brightly with the one type of linearly polarized lights.

To be more specific, it is preferable for the illumination device of the invention that the light scanning device is disposed in a region in close proximity to the light exiting end face of the homogeneous light guiding device.

To be more specific, it is preferable for the illumination device of the invention that the light scanning device is disposed in an optically conjugate region with the variable aperture in the reflection variable diaphragm device.

To be more specific, it is preferable for the illumination device of the invention that the light scanning device is disposed in a region in close proximity to an optically conjugate region with the variable aperture in the reflection variable diaphragm device.

According to these configurations, by disposing the light scanning device at or in close proximity to the superimposing region of lights to be illuminated to the subject to be illuminated, it is possible to control scanning of lights on the subject to be illuminated with accuracy.

Also, because the light scanning device is disposed at the optically conjugate position with the variable aperture, the occurrence of optical aberration caused by the light scanning device can be reduced, which in turn enables an image of illumination lights having a profile of a shape similar to the shape of the variable aperture to be formed on the subject to be illuminated (the shape of the illumination lights will not be deformed).

It is thus possible to make degrees of intermittent illumination homogeneous across the entire surface of the subject to be illuminated (to make light intensity distributions (illuminance) per unit time homogeneous).

The exemplary illumination device of the invention may be configured in such a manner that the light scanning device is formed of two rotating prisms, and the two rotating prisms are disposed, respectively, at two points before and after an optically conjugate position with the variable aperture in the reflection variable diaphragm device. According to this configuration, because two rotating prisms can be disposed in close proximity to each other with the conjugate position in between, the occurrence of optical aberration can be readily controlled, which in turn enables illumination lights to be scanned precisely and efficiently. In addition, by disposing two rotating prisms in close proximity to each other, there can be achieved an advantage that the dimension of the rotating prism in the latter stage in the length direction (the length in a direction corresponding to the scanning direction of the illumination lights by the rotating prism in the former stage) can be shorter.

Alternatively, an optical element to compensate for optical aberration upon transmission of the lights or to shape the illumination lights may be disposed at the conjugate position. According to this configuration, it is possible to enhance efficiency of transmission or to shape an illumination band on the subject to be illuminated by compensating for optical aberration upon transmission of lights by means of the optical element. In addition, part of lenses disposed before and after the rotating prism(s) can be omitted by introducing the new optical element.

A display device of the invention is a display device including a light source to emit lights and light modulating device for modulating the lights from the light source, which is characterized in that the light source is the illumination device of the invention described above.

In other words, the exemplary display device of the invention, by including the illumination device of the invention, becomes able to display high-quality moving images having no "blurring" in the edge portion as well as bright images.

A projection type display device of the invention is a projection type display device including a light source to emit lights, light modulating device for modulating the lights emitted from the light source, and projection device for projecting lights modulated by the light modulating device, which is characterized in that the light source is the illumination device of the invention described above.

In other words, the projection type display device of the invention, by including the illumination device of the invention, becomes able to project high-quality moving images having no "blurring" in the edge portion as well as bright images even when enlarged images are projected by the projecting device.

To be more specific, in order to achieve the above configurations, it is preferable that the light source and the reflection variable diaphragm device are controlled according an image signal inputted into the display device or the projection type display device. According to this configuration, it is possible to control an illumination area or the shape of illumination lights on the subject to be illuminated by controlling an aperture area and the shape of the variable aperture in the reflection variable diaphragm device according to the contents (moving speed of images) of image signals inputted into the display device or the projection type display device. It is thus possible to provide effects of improving the quality of moving images that best suit for the image signals to be inputted. In addition, because intensity of lights emitted from the light source can be controlled according to the image signals to be inputted, even when brightness per unit time on the light modulating device is changed due to the control on the aperture area and the shape thereof, it is still possible to maintain constant brightness per unit time on the light modulating means by compensating for the change.

In other words, when image signals to be inputted are for the images in fast motion, it is possible to display high-quality moving images close to the so-called impulse type display mode by reducing the aperture area of the variable aperture in the reflection type variable diaphragm device. In addition, by increasing intensity of lights to be emitted from the light source at the same time, it is possible to compensate for a reduction in brightness per unit time in the light modulating device caused by a reduction of the aperture area, which in turn enables constant brightness per unit time to be kept on the light modulating device.

BRIEF DESCRIPTION OF THE DRAWINGS

The invention will be described with reference to the accompanying drawings, wherein like numerals reference like elements, and wherein.

DETAILED DESCRIPTION OF EXEMPLARY EMBODIMENTS

Figure 1:
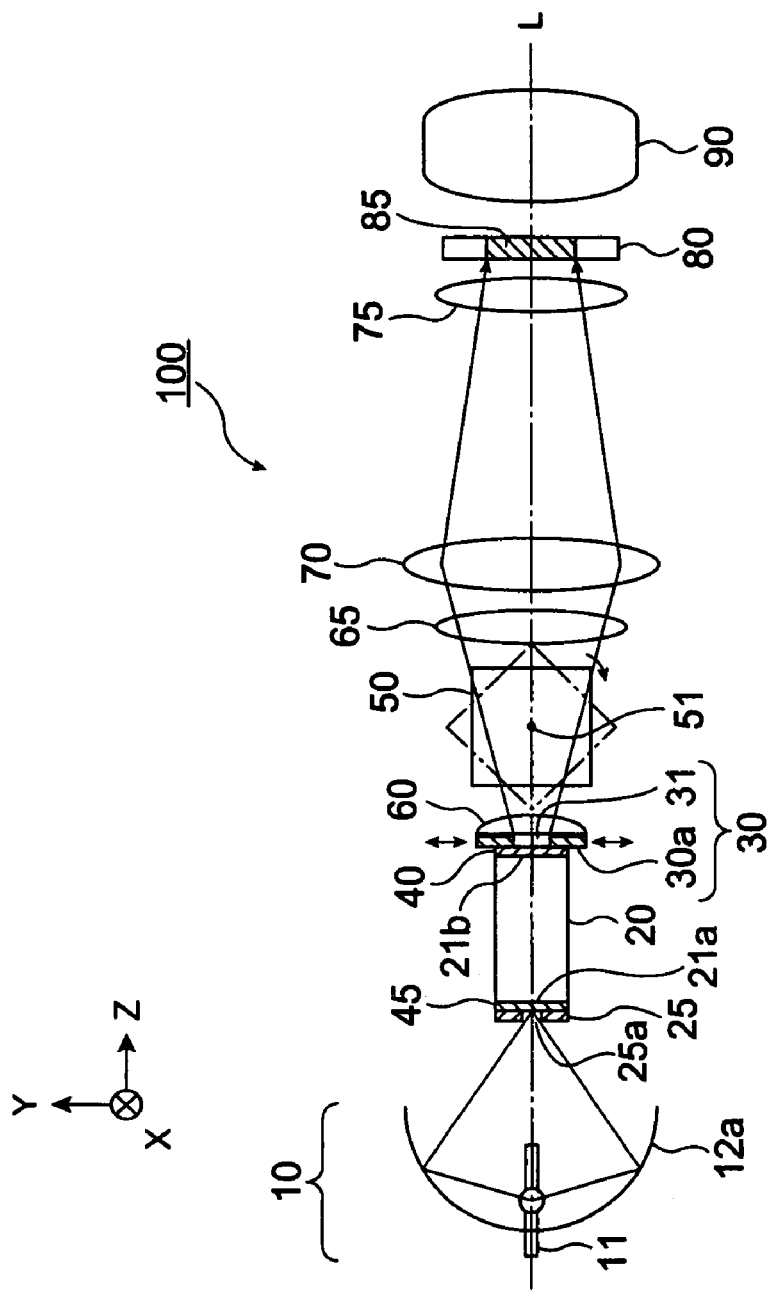
FIG. 1 is a schematic view of a projection type display device according to a first exemplary embodiment of the invention.

A first exemplary embodiment of the invention will now be described with reference to FIG. 1 through FIG. 9. FIG. 1 is a schematic view of an exemplary projection type display device (projector) in this embodiment. As is shown in FIG. 1, a projection type display device 100 chiefly can include a light source 10 to emit illumination lights (lights), a rod lens (homogeneously light guiding device) 20 to make intensity distributions of lights emitted from the light source 10 homogeneous, a rotating prism (light scanning device) 50 to scan lights, a liquid crystal light valve (light modulating device) 80 to modulate lights, and a projection lens (projecting device) 90 to project modulated lights.

The light source 10 includes a lamp 11 to emit lights, such as a metal halide lamp, and a reflector 12a to reflect lights emitted from the lamp 11 in the Z-axis direction in FIG. 1 to be collected in an aperture 25a described below.

The rod lens 20 can be made of materials having light transmissivity and a refractive index higher than that of ambient air, for example, glass or transparent resin, and is formed in the shape of a quadratic prism. Also, the rod lens 20 is disposed in such a manner that its longitudinal central axis agrees with the optical axis L, and is provided with a light incident end face 21a opposing the light source 10 and a light exiting end face 21b on the opposite side. The outline shape of the light exiting end face 21b is almost similar to the shape of a display region of the liquid crystal light valve 80 described below, for example, a shape whose ratio of the Y-axis direction to the X-axis direction in the drawing is 3:4.

The rod lens 20 may be made of solid of light-transmissive materials as described above, or alternatively it may be a hollow prism comprising four reflection mirrors with the reflection surface of each reflection mirror being faced inward.

As is shown in FIG. 1, on the light incident end face 21a of the rod lens 20 is disposed a light incident-side reflection mirror (reflecting device) 25 having an outline shape same as the shape of the light incident end face 21a with its reflection surface being opposed to the rod lens 20. A circular aperture 25a is provided at the center of the light incident-side reflection mirror 25, and it is configured to enable lights to go incident on the light incident end face 21a through the aperture 25a. The aperture 25a may be of a circular shape as described above, or alternatively it may be of various shapes, such as an elliptic shape and a square shape. Because lights collected by the reflector 12a go incident on the aperture 25a, it is preferable to set the aperture 25a to such a shape that does not shield incident lights and achieves the minimum aperture area by approximating its shape to a profile of incident lights.

In addition, a λ/4 wave plate 45 having an outline shape same as the shape of the light incident end face 21a is disposed between the light incident end face 21a and the light incident-side reflection mirror 25. The λ/4 wave plate 45 can include, for example, a retardation film formed by uniaxially stretching a crystal plate or polymeric materials.

Figure 2:
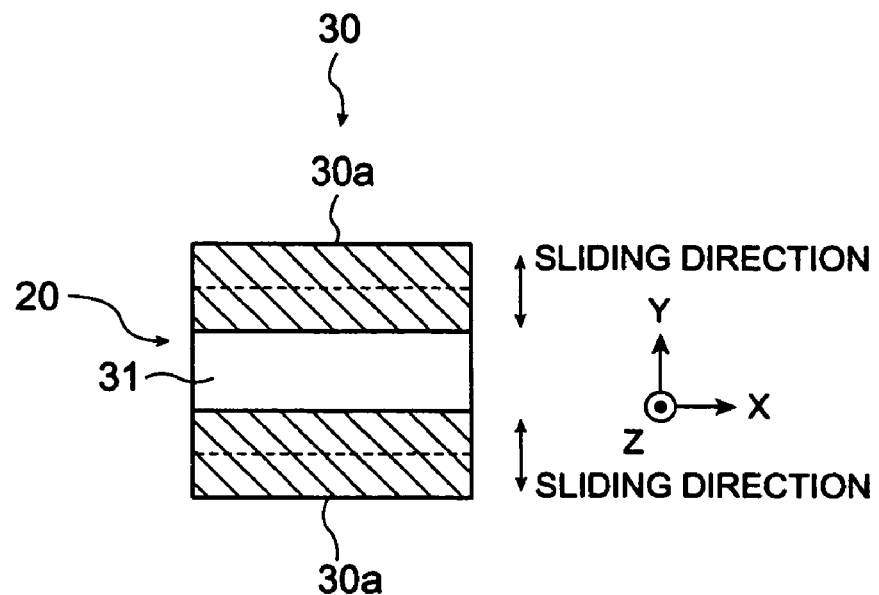
FIG. 2 is a view of a variable aperture reflection slit of the projection type display device according to the first exemplary embodiment of the invention.

FIG. 2 is a view of the rod lens and a variable aperture reflection slit of the projection type display device. As are shown in FIG. 1 and FIG. 2, on the light exiting end face 21b of the rod lens 20 is disposed a variable aperture reflection slit (reflection variable diaphragm means) 30. The variable aperture reflection slit 30 can include a pair of light shielding plates 30a, and a sliding device (not shown) that allows the light shielding plates 30a to move by sliding. Each light shielding plate 30a is formed in a rectangular shape, and is formed in such a manner that the length in the X-axis direction is at least equal to the length of the light exiting end face 21b in the X-axis direction, while the length in the Y-axis direction is at least half the length of the light exiting end face 21b in the Y-axis direction. In addition, a reflection surface to reflect illumination lights is formed on the light shielding plate 30a on the surface opposing the light exiting end face 21b.

Further, the light shielding plates 30a are disposed in such a manner that their longitudinal axial lines are parallel to the X-axis direction in the drawing while being disposed symmetrically with respect to the optical axis L to be spaced apart in the Y-axis direction. Moreover, the paired light shielding plates 30a are disposed symmetrically with respect to the Y-axis direction to be able to move by sliding along the light exiting end face 21b. The paired light shielding plates 30a are also disposed in such a manner that they concurrently come in close proximity to or are spaced apart from each other in forming a variable aperture 31 of a rectangle shape. In other words, it is configured in such a manner that an aperture width of the variable aperture 31 in the Y-axis direction can vary in association with movements of the paired light shielding plates 30a. The paired light shielding plates 30a are allowed to move by sliding at least to the extent that the area of the variable aperture 31 is equal to the area of the light exiting end face 21b. Also, the variable aperture reflection slit 30, by controlling the variable aperture 31 of a rectangular shape, becomes able to control an illumination band 85 whose image is formed on the liquid crystal light valve 80 as to the length in the Y-axis direction (length in the longitudinal direction) in the drawing.

The sliding device is to move the light shielding plates 30a by sliding through a known sliding mechanism, and the mechanism and the structure thereof should not be especially limited. For example, a combination of a pinion gear and a rack gear can be used.

The paired light shielding plates 30a may be allowed to move by sliding symmetrically with respect to the optical axis L (the two light shielding plates 30a move concurrently by sliding) as described above, or the light shielding plates 30a may be moved by sliding one by one, that is, the manner of movements should not be especially limited.

A reflection type polarizer (reflection type polarizing means) 40 having the same outline shape as the shape of the light exiting end face 21b is disposed between the variable aperture reflection slit 30 and the light exiting end face 21b. Examples of the reflection type polarizer 40 include a wire grid array. In regard to the relation of the variable aperture reflection slit 30 and the reflection type polarizer 40 as to their locations, they may be disposed in order of the reflection type polarizer 40 and the variable aperture reflection slit 30 from the light exiting end face 21b side as has been described, or they may be disposed in order of the variable aperture reflection slit 30 and the reflection type polarizer 40 from the light exiting end face 21b side.

As is shown in FIG. 1, the rotating prism 50 is made of a light-transmissive material having a refractive index larger than that of ambient air, for example, glass or transparent resin, and the cross section (the YZ plane in FIG. 1) that intersects with the rotating axis 51 at right angles is formed at least in the shape of a regular quadratic prism. Also, the rotating prism 50 is disposed in such a manner that its rotating axis 51 is parallel to the X axis in the drawing and intersects with the optical axis L. The rotating prism 50 is thus able to scan the illumination band 85 whose image is formed on the liquid crystal light valve 80 in the longitudinal direction (Y-axis direction in the drawing).

In addition, the rotating prism 50 is provided with a rotating device (not shown), and the rotating device controls the rotating prism 50 to rotate about the rotating axis 51 in the direction indicated by an arrow in the drawing. Various techniques can be used as the rotating device, and various mechanisms and structures can be used, for example, by directly connecting an electromagnetic motor whose rotations are controllable to the rotating prism 50.

A transmission type active-matrix liquid crystal cell in the TN (Twisted Nematic) mode using a thin film transistor (hereinafter, abbreviated to TFT) as a pixel switching element is used as the liquid crystal light valve 80.

A light collecting lens 60 is disposed between the variable aperture reflection slit 30 and the rotating prism 50, and relay lenses 65 and 70 and a parallelizing lens 75 are disposed in this order from the rotating prism 50 side, between the rotating prism 50 and the liquid crystal light valve 80.

Functions of the projection type display device 100 configured as described above will now be described. Functions until illumination lights emitted from the light source are projected on a screen will be described first.

When power is supplied to the lamp 11 of the light source 10, illumination lights, which are random polarized lights, are emitted from the lamp 11. The illumination lights emitted from the lamp 11 are collected in the aperture 25a in the light incident-side reflection mirror 25 by the reflector 12a, and then come inside the rod lens 20 from the light incident end face 21a by passing through the λ/4 wave plate 45.

Being random polarized lights, the illumination lights that come inside the rod lens 20 are emitted intact in the form of random polarized lights after they have passed through the λ/4 wave plate 45. The illumination lights that have come inside the rod lens 20 to propagate through the rod lens 20 will eventually have homogeneous intensity distributions as they repetitively undergo total reflection inside the rod lens 20, and arrive the light exiting end face 21b on which the reflection type polarizer 40 is disposed.

Of the illumination lights that come incident on the reflection type polarizer 40, P-polarized lights (one type of polarized lights) are emitted intact toward the variable aperture reflection slit 30 by passing through the reflection type polarizer 40, while S-polarized lights (the other type of polarized lights) are reflected on the reflection type polarizer 40.

The S-polarized lights thus reflected propagate through the rod lens 20 by being reflected repetitively, and go incident on the λ/4 wave plate 45. The S-polarized lights that come incident on the λ/4 wave plate 45 are converted, for example, to right-handed circularly polarized lights, then emitted toward the light incident-side reflection mirror 25, and reflected on the light incident-side reflection mirror 25. The right-handed circularly polarized lights are converted to left-handed circularly polarized lights when they are reflected, and go incident again on the λ/4 wave plate 45. The left-handed circularly polarized lights are converted to P-polarized lights when they pass through the λ/4 wave plate 45, and emitted toward the variable aperture reflection slit 30 by passing through the reflection type polarizer 40. By undergoing this process, part of the S-polarized lights reflected on the reflection type polarizer 40 undergo polarization conversion, and are converted to P-polarized lights capable of passing through the reflection type polarizer 40.

As are shown in FIG. 1 and FIG. 2, of the illumination lights (P-polarized lights) that come incident on the variable aperture reflection slit 30, the illumination lights that come incident on the variable aperture 31, which is a region where no light shielding plate 30*a* is disposed, are emitted intact in the Z-axis direction in the drawing, whereas the illumination lights that come incident on regions where the light shielding plates 30*a* are disposed are reflected toward the light incident-side reflection mirror 25.

The illumination lights thus reflected propagate through the rod lens 20 as they repetitively undergo total reflection, and go incident on the light incident-side reflection mirror 25 to be reflected again toward the variable aperture reflection slit 30. The illumination lights reflected on the light incident-side reflection mirror 25 go incident again on the variable aperture reflection slit 30, and part of the lights are emitted through the variable aperture 31 as illumination lights while the rest of the lights are reflected on the light shielding plates 30*a*. By undergoing this process, part of the lights reflected on the light shielding plates 30*a* are emitted from the variable aperture reflection slit 30 to serve as usable illumination lights.

Illumination lights emitted from the variable aperture reflection slit 30 go incident on the rotating prism 50 by passing through the light collecting lens 60.

Figure 4:
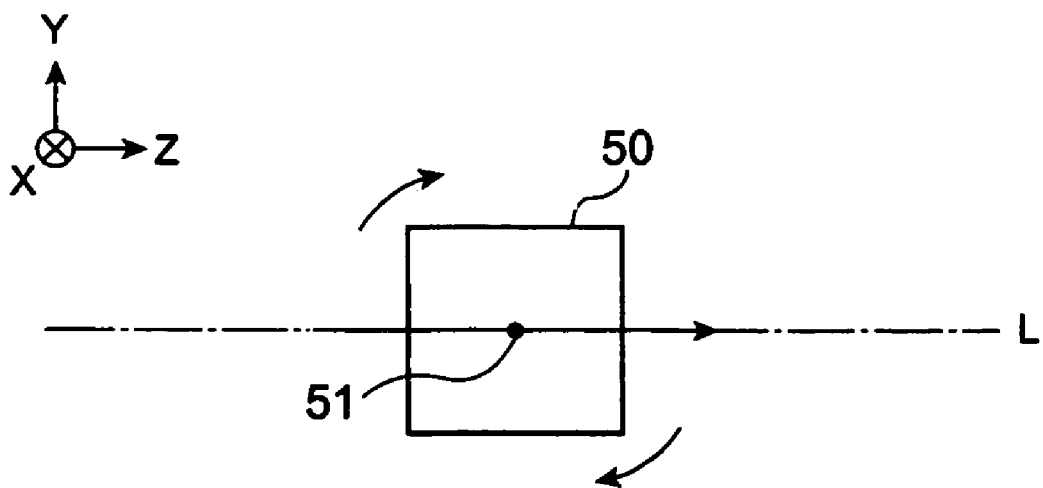
FIG. 4 is a view used to describe scanning of illumination lights by a rotating prism according to the first exemplary embodiment of the invention.

In a case as is shown in FIG. 4 where the rotating phase of the rotating prism 50 is a phase at which the surface on which the illumination lights go incident is perpendicular to the optical axis L, illumination lights that come incident on the rotating prism 50 from the left in the drawing are emitted to the right in the drawing as they travel straight without being refracted. Herein, the illumination lights are illustrated as beams parallel to the optical axis L for simplicity of the description. However, beams that are not parallel to the optical axis L behave almost in the same manner as parallel beams provided that an intersection angle with the optical axis L is small. Hereinafter, the illumination lights are illustrated as beams and described as such.

Figure 5:
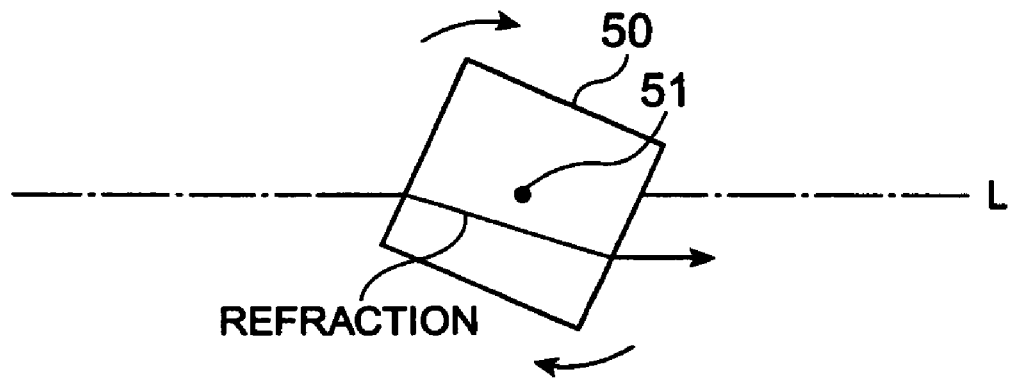
FIG. 5 is a view used to describe scanning of illumination lights by the rotating prism according to the first exemplary embodiment of the invention.

FIG. 5 shows one of the states while the rotating prism 50 at the rotating phase shown in FIG. 4 is rotating in a range from 0° to 45° in the direction indicated by an arrow in the drawing. In this case, illumination lights that come incident on the rotating prism 50 from the left in the drawing undergo refraction at the interface between the light-transmissive material of the rotating prism and air. The optical path is thus shifted downward in the drawing almost in parallel, and the illumination lights are emitted to the right in the drawing.

Figure 6:
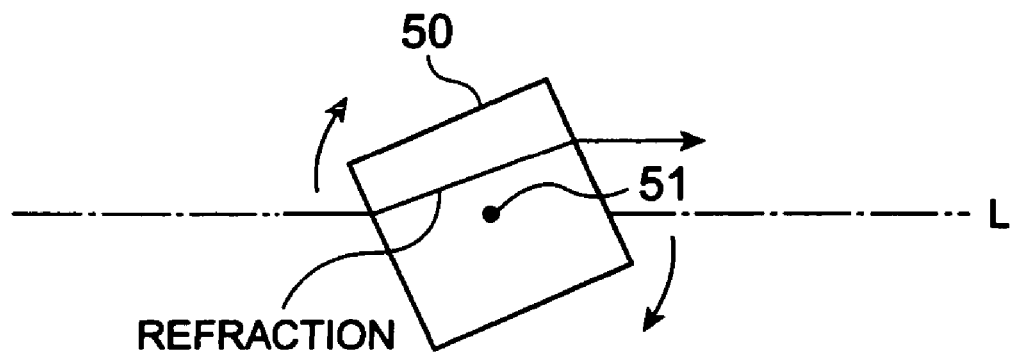
FIG. 6 is a view used to describe scanning of illumination lights by the rotating prism according to the first exemplary embodiment of the invention.

FIG. 6 shows one of the states while the rotating prism 50 at the rotating phase shown in FIG. 4 is rotating in a range from 45° to 90° in the direction indicated by an arrow in the drawing. In this case, the optical path is shifted in the opposite direction to that in FIG. 5 almost in parallel, and the illumination lights are emitted to the right in the drawing.

Figure 7:
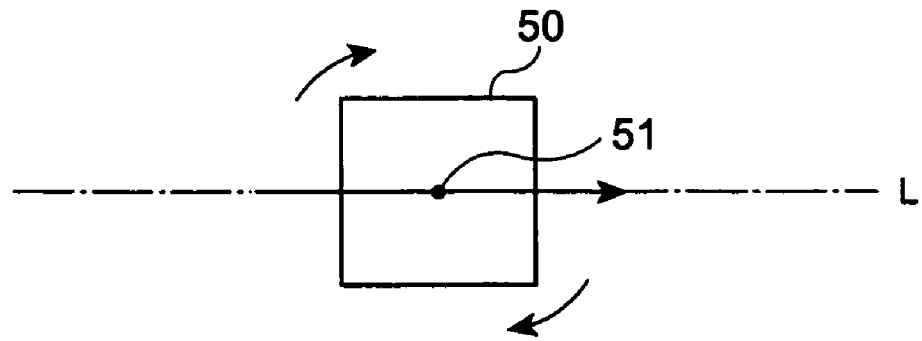
FIG. 7 is a view used to describe scanning of illumination lights by the rotating prism according to the first exemplary embodiment of the invention.

FIG. 7 shows a state when the rotating prism 50 at the rotating phase shown in FIG. 4 has rotated by 90° in the direction indicated by an arrow in the drawing. In this case, as with the case of FIG. 4, illumination lights that come incident on the rotating prism 50 from the left in the drawing travel straight without being refracted to be emitted to the right in the drawing.

As has been described, the illumination lights are emitted by shifting the optical path to be almost parallel to the optical axis L in association with rotations of the rotating prism 50. A quantity of shift (a quantity of displacement in the Y-axis direction) of the illumination lights from the optical axis L in FIG. 5 and FIG. 6 depends on a refractive index and the dimensions of the light-transmissive material forming the prism, the rotating angle of the prism, and the like.

Figure 3:
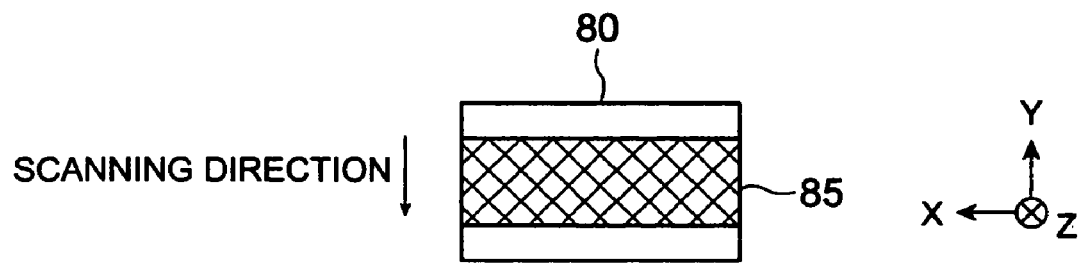
FIG. 3 is a view specifying a scanning direction of an illumination band according to the first exemplary embodiment of the invention.

The illumination lights emitted from the rotating prism 50 pass through the rely lenses 65 and 70 and the parallelizing lens 75, and form an image as a band-like illumination band 85 as is shown in FIG. 3 on the liquid crystal light valve 80, which is the subject to be illuminated. Because the variable aperture 31 and the light incident end face (display region) of the liquid crystal light valve 80 are set to have an optically, conjugate positional relation, the illumination band 85 thus formed is of a shape similar to the shape of the variable aperture 31. The illumination band 85 is scanned (moved) from top to bottom in the drawing as the rotating prism 50 rotates. In addition, when the illumination band 85 reaches the bottom end of the liquid crystal light valve 80, it is scanned again downward from the top end of the liquid crystal light valve 80.

The illumination lights irradiated to the liquid crystal light valve 80 are modulated according to image signals inputted into the projection type display device 100, and projected onto a screen (not shown) by the projection lens 90.

Control on the light source 10 and the variable aperture reflection slit performed according to image signals inputted into the projection type display device 100 will now be described with reference to FIG. 8.

Figure 8:
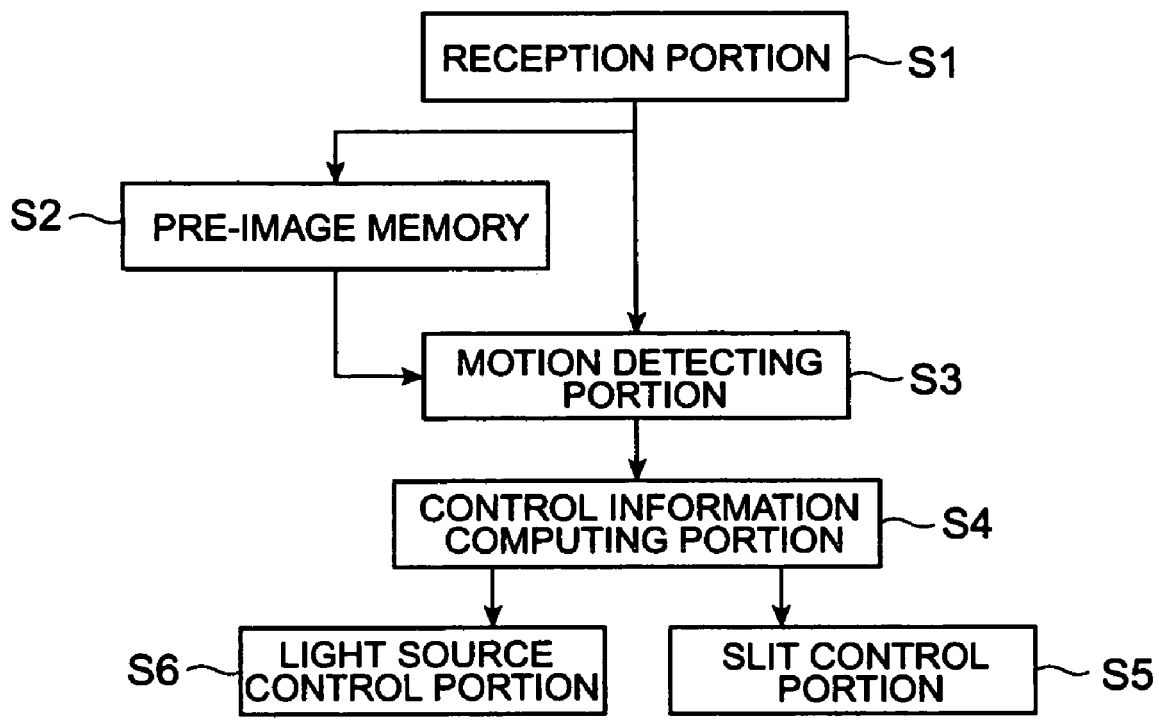
FIG. 8 is a view showing a control method of the projection type display device according to the first exemplary embodiment of the invention.

As is shown in FIG. 8, an image signal inputted into the projection type display device 100 is first inputted into a reception portion S1. The image signal is then sent to both a pre-image memory S2 and a motion detecting portion S3. The image signal sent to the pre-image memory S2 is stored for one frame, and then sent to the motion detecting portion S3. In short, the pre-image memory S2 is used as a buffer for image signals.

In the motion detecting portion S3, difference information between the image signal sent from the reception portion S1 and the one-frame earlier image signal sent from the pre-image memory S2 is extracted to detect motion information of the image signals.

The motion information thus detected is sent to a control information computing portion S4, and the control information computing portion S4 generates control signals for a slit control portion S5 and a light source control portion S6 on the basis of the motion information. The slit control portion S5 controls the variable aperture reflection slit 30 to drive the light shielding plates 30*a* under control, on the basis of the control signal sent from the control information computing portion S4. The light source control portion S6 controls intensity of illumination lights emitted from the lamp 11 by controlling power to be supplied to the lamp 11, on the basis of the control signal also sent from the control information computing portion S4.

For example, when an image signal for fast motion is inputted, the control information computing portion S4 generates a control signal for the slit control portion S5 to reduce the area of the variable aperture 31 by bringing the light shielding plates 30a in close proximity to each other. Further, in order to compensate for a reduction in quantity of illumination lights per unit time with respect to the liquid crystal light valve 80 caused by reducing the area of the variable aperture 31, it generates a control signal for the light source control portion S6 to raise intensity of illumination lights emitted from the lamp 11.

Conversely, when an image signal for slow motion is inputted, the control information computing portion S4 generates a control signal for the slit control portion S5 to increase the area of the variable aperture 31 by spacing the light shielding plates 30a apart from each other. Further, in order to compensate for an increase in quantity of illumination lights per unit time with respect to the liquid crystal light valve 80 caused by increasing the area of the variable aperture 31, it generates a control signal for the light source control portion S6 to lower intensity of illumination lights emitted from the lamp 11.

In a case where the area of the variable aperture 31 is controlled in real time to correspond to the contents in the image signal (a degree of a quantity of motion components), it is preferable to change intensity of illumination lights from the light source 10 to correspond to a change of the area of the variable aperture 31. For example, when the area of the variable aperture 31 is small, the intensity of illumination lights is raised, and conversely, when the area is large, intensity of illumination lights is lowered. By so doing, it is possible to illuminate the subject to be illuminated at constant intensity without being affected by a change of the area of the variable aperture 31, and the image quality will not be deteriorated because no flickering occurs in a projected image. The same effects can be achieved by the configuration to change a luminance value of image data to be written into the liquid crystal light valve 80 to correspond to a change of the area of the variable aperture 31 instead of the configuration to change intensity of illumination lights. For example, when the area of the variable aperture 31 is small, a luminance value of image data to be written into the liquid crystal light valve 80 is shifted to the bright side, and conversely, when the area is large, a luminance value of image data to be written is shifted to the dark side. Alternatively, the two configurations described above may be used together. Meanwhile, a control mode to change (or maintain) intensity of illumination lights from the light source 10 regardless of a change of the area of the variable aperture 31 may be provided. This is a control mode suitable, for example, in a case where the image quality (sharpness and brightness in the edge portion) is controlled as the viewer desires.

In the case of a motion-less image signal, the control information computing portion S4 generates a control signal for the slit control portion S5 to space the light shielding plates 30a further apart from each other, so that the area of the variable opening 31 is reduced at least to be equal to the area of the light exiting end face 21b.

In this case, the rotating prism 50 may be kept rotating as described above, or suspended at the rotating phase as is shown in FIG. 4 to stop the illumination band 85 from being scanned. Alternatively, the rotating prism 50 may be removed from the path of the illumination lights to stop the illumination band 85 from being scanned.

In addition, in a case where a signal of a landscape image (an aspect ratio of 9:16), for example, like a movie is the image signal inputted into the projection type display device 100 provided with the rod lens 20 whose light exiting end face 21b has an outline shape with a ratio (an aspect ratio) of 3:4, the control information computing portion S4 generates a control signal for the slit control portion S5 to make the variable aperture 31 into a shape (having a ratio of 9:16 in the case of a movie) similar to the shape of the effective image display region (a region where a meaningful image is displayed, excluding band-like black regions appearing on the top and the bottom of the screen where no image is displayed).

In this case, because illumination lights are irradiated only to the image display region of the liquid crystal light valve 80, it is possible to enhance efficiency of utilization of illumination lights emitted from the light source 10.

The shape of the variable aperture 31 may be made into a shape having a ratio of 9:16 as has been described to illuminate across the entire effective image display region, or alternatively the scan region of the illumination band 85 may be changed and limited to the effective image display region alone. Examples of the method of changing the scan region include a method of using rotating prisms having different scan regions as occasion demands.

For example, rotating prisms having different scan regions are disposed linearly with respect to the optical axis L, and a rotating prism used to scan illumination lights can be chosen by rotating the rotating prism used to scan illumination lights and keeping the other rotating prisms not used to scan illumination lights at rest at the rotating phase (see FIG. 4) at which the illumination lights are not refracted. Alternatively, rotating prisms having different scan regions are formed to share the rotating axis, and a rotating prism used to scan illumination lights can be chosen by causing the rotating prisms to move by sliding in the direction of the rotating axis.

In this case, the liquid crystal light valve 80 is illuminated intermittently, which can in turn enhance the display quality of moving images.

According to the configuration as described above, because the variable aperture reflection slit 30 capable of changing the area of the variable aperture 31 through which illumination lights are emitted and the rotating prism 50 are provided, not only is it possible to change the breadth of the illumination band 85 (to change the width in the Y-axis direction) that illuminates the liquid crystal light valve 80, but it is also possible to illuminate across the entire surface of the liquid crystal light valve 80 by scanning the illumination band 85. A degree of intermittent illumination (a ratio of the illumination time per unit time) to the liquid crystal light valve 80 can be thus changed.

Hence, when the projection type display device 100 is to display images in fast motion, a characteristic close to a display by the so-called impulse type can be achieved by reducing the aperture area (the aperture width in the Y-axis direction) of the variable aperture 31, which enables images in fast motion to be displayed as high-quality moving images without causing blurring or smearing in the edge portion or the like. Conversely, when images with less motion are to be displayed, a ratio of the illumination time per unit time is increased by increasing the aperture area of the variable aperture 31 (by increasing the aperture width in the Y-axis direction), which enables bright images to be displayed.

Because the rod lens 20 is provided with the light incident-side reflection mirror 25 disposed on the light incident end face 21a side and the variable aperture reflection slit 30 disposed on the light exiting end face 21b side, not only can efficiency of utilization of illumination lights emitted from the light source 10 be improved, but also efficiency of utilization of illumination lights emitted from the variable aperture reflection slit 30 can be improved.

In other words, illumination lights that are reflected instead of being emitted through the variable aperture 31 in the variable aperture reflection slit 30 are reflected on the light incident-side reflection mirror 25 again toward the light exiting end face 21b, and are thus irradiated to the liquid crystal light valve 80 through the variable aperture 31.

Because the rod lens 20 is provided with the λ/4 wave plate 45 disposed on the light incident end face 21a side and the reflection type polarizer 40 disposed on the light exiting end face 21b side, of the random polarized lights emitted from the light source 10, it allows P-polarized lights to be emitted from the reflection type polarizer 40 and reflects S-polarized lights on the reflection type polarizer 40. Because S-polarized lights are converted to P-polarized lights by the light incident-side reflection mirror 25 and the λ/4 wave plate 45, it is possible to illuminate the liquid crystal light valve 80 that uses polarized lights when displaying images efficiently with one kind of polarized lights, which enables bright images to be displayed.

Illumination lights emitted from the rod lens 20 can be scanned by rotating the rotating prism 50. It is thus possible to control a speed of illumination lights scanned on the liquid crystal light valve 80 with a rotating speed of the rotating prism 50, and the speed can be controlled more readily than a method of scanning reflection lights by oscillating the mirror from right to left and vice versa, for example, like a galvanometer mirror.

Because it is possible to control the aperture area of the variable aperture 31 in the variable aperture reflection slit 30 depending on the contents (moving speed of images) of image signals inputted into the projection type display device 100, it is possible to provide effects of improving the quality of moving images that best suit for the image signals to be inputted. In addition, because it is possible to control intensity of lights emitted from the light source 10 depending on the image signals to be inputted, even when brightness per unit time on the liquid crystal light valve 80 is changed due to the control on the aperture area, it is still possible to keep constant brightness per unit time on the liquid crystal light valve 80 by compensating for the change.

Figure 9:
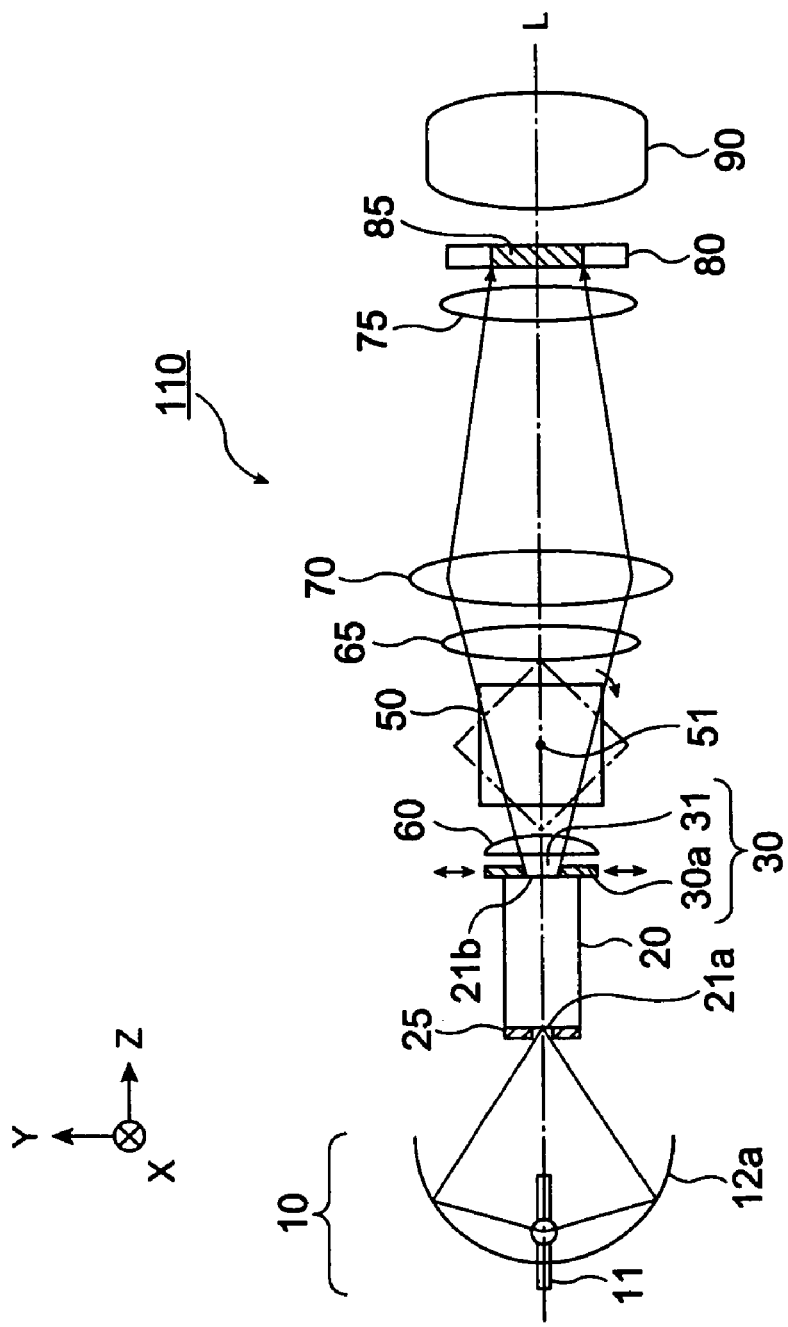
FIG. 9 is a schematic view of a projection type display device as a modification of the first exemplary embodiment of the invention.

Incidentally, the liquid crystal light valve 80 may be illuminated with P-polarized lights alone by providing the rod lens 20 with the λ/4 wave plate 45 and the reflection type polarizer 40 as has been described. Alternatively, as is shown in FIG. 9, a projection type display device 110 may be formed to illuminate the liquid crystal light valve 80 using random polarized lights intact by providing the rod lens 20 with the light incident-side reflection mirror 25 and the variable aperture reflection slit 30 alone. In this case, a display element that does not use polarized lights when displaying images, for example, a polymer dispersed liquid crystal (PDLC), is suitable as the liquid crystal light valve 80. It goes without saying, however, that a display element using polarized lights as in this embodiment can be used.

Control signals for the slit control portion S5 and the light source control portion S6 may be generated on the basis of image signals inputted into the control information computing portion S4 as has been described, or alternatively, an input portion may be provide for the viewer to input his desired image quality into the control information computing portion S4 to generate control signals for the slit control portion S5 and the light source control portion S6 on the basis of information inputted into the input portion.

A second exemplary embodiment of the invention will now be described with reference to FIG. 10. A projection type display device in this embodiment is the same as the counterpart in the first exemplary embodiment in the basic configuration, but is different from the counterpart in the first exemplary embodiment in the periphery of the rotating prism. Hence, in this embodiment, the periphery of the rotating prism alone will be described with reference to FIG. 10, and descriptions of the light source and the like are omitted.

Figure 10:
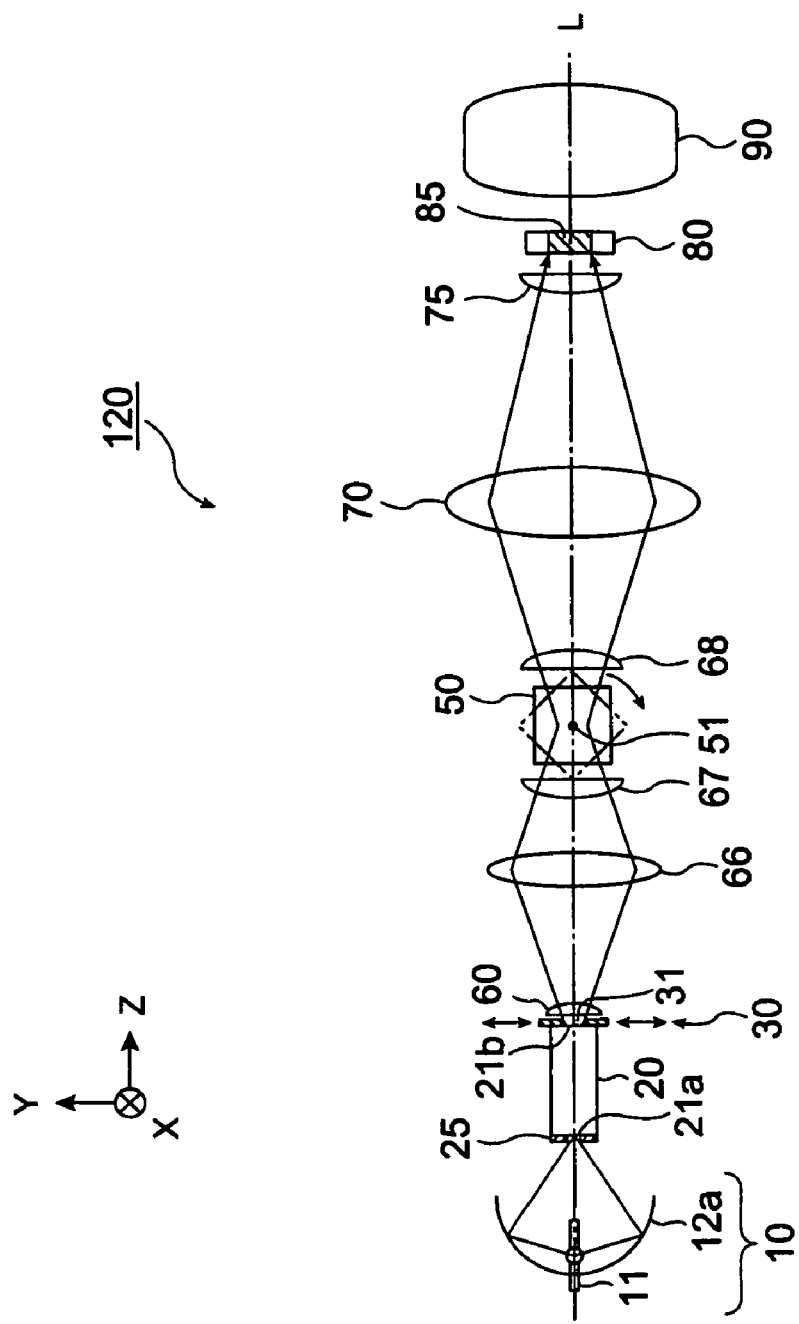
FIG. 10 is a schematic view of a projection type display device according to a second exemplary embodiment of the invention.

FIG. 10 is a schematic view of the projection type display device in this embodiment. As is shown in FIG. 10, a projection type display device 120 chiefly can include a light source 10 to emit lights, a rod lens 20 to make intensity distributions of lights emitted from the light source 10 homogeneous, a rotating prism 50 to scan lights, a liquid crystal light valve 80 to modulate lights, and a projection lens 90 to project modulated lights.

On a light incident end face 21a and a light exiting end face 21b of the rod lens 20 are disposed, respectively, a light incident-side reflection mirror 25 and a variable aperture reflection slit 30. In addition, a λ/4 wave plate may be disposed between the light incident end face 21a and the light incident-side reflection mirror 25, and a reflection type polarizer 40 may be disposed between the variable aperture reflection slit 30 and the light exiting end face 21b.

A light incident-side lens 60, a relay lens 66, and a light exiting-side lens 67 are disposed between the variable aperture reflection slit 30 and the rotating prism 50. A group of these lenses 60, 66, and 67 is configured to guide illumination lights emitted from the variable aperture reflection slit 30 to the rotating prism 50, so that an image of light intensity distributions (optical image) of the variable aperture 31 will be formed efficiently and precisely at or nearly at the center of the rotating prism 50. In other words, the rotating prism 50 is disposed in such a manner that its center or almost its center establishes an optically, conjugate positional relation with the variable aperture 31 in the variable aperture reflection slit 30.

Other incident-side lens 68, relay lens 70, and light exiting-side lens 75 are disposed between the rotating prism 50 and the liquid crystal light valve 80. A group of these lenses 68, 70, and 75 can be furnished with the same function as the group of lenses 60, 66, and 67 described above, that is to say, it is configured to guide illumination lights emitted from the rotating prism 50 to the liquid crystal light valve 80, so that an image of light intensity distributions (optical image) at or nearly at the center of the rotating prism 50 will be formed efficiently and precisely on the light incident end face (display region) of the liquid crystal light valve 80. In other words, the rotating prism 50 is disposed at an optically conjugate position with the light incident end face (display region) of the liquid crystal light valve 80.

Functions of the projection type display device 120 configured as described above will now be described. Because the functions until illumination lights emitted from the light source 10 are emitted from the variable aperture reflection slit 30 after intensity distributions are made homogeneous by the rod lens 20 are the same as those in the first embodiment, descriptions thereof are omitted. Illumination lights emitted through the variable aperture 31 in the variable aperture reflection slit 30 are transmitted to the rotating prism 50 by means of the light incident-side lens 60, the relay lens 66, and the light exiting-side lens 67 to form an image as an illumination band of a shape substantially similar to the shape of the variable aperture 31.

As in the first exemplary embodiment, the rotating prism 50 rotates in the direction indicated by an arrow in the drawing, and illumination lights pass through the rotating prism 50 while the optical axis is shifted due to the relation with a rotating angle and a refractive index of the rotating prism 50 (see FIG. 4 through FIG. 7).

Illumination lights emitted from the rotating prism 50 are irradiated to the liquid crystal light valve 80 by means of the light incident-side lens 68, the relay lens 70, and the light exiting-side lens 75 to form an image as an illumination band 85. Because the illumination band 85 is scanned by the rotating prism 50, it is scanned on the light incident end face of the liquid crystal light valve 80 from top to bottom in the drawing.

Because the functions and effects are the same as those of the first embodiment once the illumination lights come incident on the liquid crystal light valve 80, descriptions thereof are omitted.

According to the configuration described above, a superimposing region where illumination lights from the rod lens 20 are superimposed can be set at or nearly at the center (rotational center) of the rotating prism 50. Illumination lights are thus superimposed at the center first and then transmitted to the liquid crystal light valve 80. It is thus possible to control the scanning of the illumination band 85 on the liquid crystal light valve 80 with accuracy.

In addition, because the rotating prism 50 is disposed at the optically conjugate position with the variable aperture 31, the occurrence of optical aberration caused by the rotating prism 50 can be reduced. It is thus possible to form an image precisely and efficiently on the liquid crystal light valve 80 as the illumination band 85 of a shape similar to the shape of the variable aperture 31 (the shape of the illumination band 85 will not be deformed).

In view of the foregoing, because it is possible to make degrees of intermittent illumination homogeneous across the entire surface of the liquid crystal light valve 80 (to make light intensity distributions per unit time homogeneous), not only can brightness distributions be homogeneous across the entire surface of a projected image, but also the display quality of moving images can be enhanced homogeneously for the overall image.

A third exemplary embodiment of the invention will now be described with reference to FIG. 11 and FIG. 12. A projection type display device in this exemplary embodiment is the same as the counterpart in the first exemplary embodiment in the basic configuration, but is different from the counterpart in the first embodiment in the periphery of the rotating prism. Hence, in this embodiment, the periphery of the rotating prism alone will be described with reference to FIG. 11 and FIG. 12, and descriptions of the light source and the like are omitted.

Figure 11:
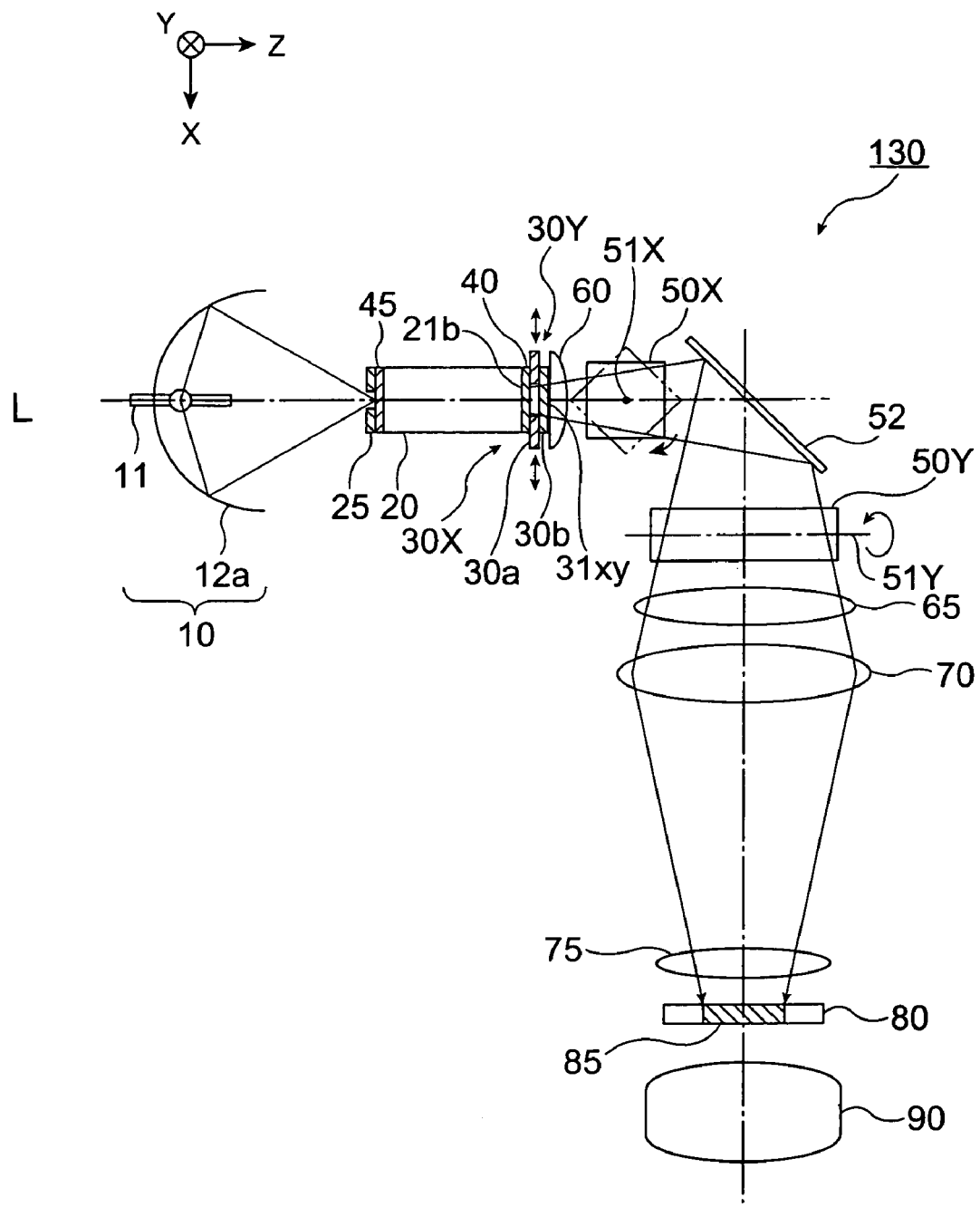
FIG. 11 is a schematic view of a projection type display device according to a third exemplary embodiment of the invention.

FIG. 11 is a schematic view of the projection type display device in this embodiment. As is shown in FIG. 11, a projection type display device 130 chiefly can include light source 10 to emit lights, a rod lens 20 to make intensity distributions of lights emitted from the light source 10 homogeneous, rotating prisms 50X and 50Y to scan lights, a liquid crystal light valve 80 to modulate lights, and a projection lens 90 to project modulated lights.

Variable aperture reflection slits 30X and 30Y are disposed on a light exiting end face 21b of the rod lens 20, and a reflection type polarizer 40 is disposed between the variable aperture reflection slits 30X and 30Y and the light exiting end face 21b. The variable aperture reflection slits 30X and 30Y comprise, respectively, a pair of light shielding plates 30a, and another pair of light shielding 30b, and sliding devices (not shown) to move the light shielding plates 30a and 30b by sliding.

In the variable aperture reflection slit 30X, the paired light shielding plates 30a are disposed in such a manner that their longitudinal axial lines become parallel to the Y-axis direction in the drawing, and are disposed symmetrically with respect to the optical axis L so as to be spaced apart symmetrically along the X-axis direction. Further, the paired light shielding plates 30a are disposed to be able to move by sliding in the X-axis direction along the light exiting end face 21b. In other words, it is configured in such a manner that the aperture width of a variable aperture 31xy in the X-axis direction can vary in association with the movements of the paired light shielding plates 30a. Also, the paired light shielding plates 30a are allowed to move by sliding at least to the extent that the aperture width of the variable aperture 31xy in the X-axis direction becomes equal to the aperture width of the light exiting end face 21b in the X-axis direction. In addition, the variable aperture reflection slit 30X, by controlling the aperture width of the variable aperture 31xy of a rectangular shape in the X-axis direction, becomes able to control an illumination band 85 whose image is formed on the liquid crystal light valve 80 as to the length in the Z-axis direction in FIG. 12.

In the variable aperture reflection slit 30Y, the paired light shielding plates 30b are disposed in such a manner that their longitudinal axial lines become parallel to the X-axis direction in the drawing, and are disposed symmetrically with respect to the optical axis L so as to be spaced apart symmetrically along the Y-axis direction. Further, the paired light shielding plates 30b are disposed to be able to move by sliding in the Y-axis direction along the light exiting end face 21b. In other words, it is configured in such a manner that the aperture width of the variable aperture 31xy in the Y-axis direction can vary in association with the movements of the paired light shielding plates 30b. Also, the paired light shielding plates 30b are allowed to move by sliding at least to the extent that the aperture width of the variable aperture 31xy in the Y-axis direction becomes equal to the aperture width of the light exiting end face 21b in the Y-axis direction. In addition, the variable aperture reflection slit 30Y, by controlling the aperture width of the variable aperture 31xy of a rectangular shape in the Y-axis direction, becomes able to control the illumination band 85 whose image is formed on the liquid crystal light valve 80 as to the length in the Y-axis direction in FIG. 12.

The rotating prisms 50X and 50Y are made of a light-transmissive material having a refractive index larger than that of ambient air, for example, glass or transparent resin, and the cross sections (the XZ plane in the case of the rotating prism 50X and the XY plane in the case of the rotating prism 50Y) that intersect with the rotating axis 51 at right angles are formed at least in the shape of a regular prism. Also, the rotating prisms 50X and 50Y are disposed in order of the rotating prism 50X and the rotating prism 50Y from the rod lens 20 side, and a reflection mirror 52 is disposed between the rotating prism 50X and the rotating prism 50Y.

The rotating prism 50X is disposed in such a manner that its rotating axis 51X is parallel to the Y axis in the drawing, and the rotating prism 50Y is disposed in such a manner that its rotating axis 51Y is parallel to the Z-axis in the drawing. The rotating prism 50X is thus able to scan the illumination band 85 whose image is formed on the liquid crystal light valve 80 in Z-axis direction (X-axis direction at the position in the rotating prism 50X), and the rotating prism 50Y is thus able to scan the illumination band 85 whose image is formed on the liquid crystal light valve 80 in Y-axis direction (Y-axis direction at the position in the rotating prism 50Y).

The reflection mirror 52 may be omitted because it is provided for the purpose of merely reducing the illumination device in size by bending the illumination optical path somewhere in the middle.

A light collecting lens 60 is disposed between the variable aperture reflection slit 30Y and the rotating prism 50X, and relay lenses 65 and 70 and a parallelizing lens 75 are disposed between the rotating prism 50Y and the liquid crystal light valve 80.

Functions of the projection type display device 130 configured as described above will now be described. Because the functions until illumination lights emitted from the light source 10 in the form of random polarized lights are separated into P-polarized lights and S-polarized lights by the reflection type polarizer 40 for the P-polarized lights alone to be emitted are the same as those in the first embodiment, descriptions thereof are omitted.

Of the illumination lights emitted from the reflection type polarizer 40 that come incident on the variable aperture reflection slits 30X and 30Y, the illumination lights that come incident on the variable aperture 31xy, which is a region where neither the light shielding plates 30a nor the light shielding plates 30b are disposed, are emitted intact as P-polarized lights in the Z-axis direction in the drawing, whereas illumination lights that come incident on regions where the light shielding plates 30a and the light shielding plates 30b are disposed are reflected toward the light incident-side reflection mirror 25.

Illumination lights thus reflected go incident on the light incident-side reflection mirror 25 and are reflected again toward the variable aperture reflection slit 30. Illumination lights reflected on the light incident-side reflection mirror 25 go incident again on the variable aperture reflection slit 30, and part of the lights are emitted as illumination lights (P-polarized lights) through the variable aperture 31xy while the rest of the lights are reflected on the light shielding plates 30a.

Illumination lights emitted from the variable aperture reflection slits 30X and 30Y first go incident on the rotating prism 50X. Because the rotating prism 50X rotates about the rotating axis 51X that is parallel to the Y axis in the drawing, illumination lights pass through the rotating prism 50X while the optical axis is shifted in parallel in the X-axis direction due to the relation with a rotating angle and a refractive index of the rotating prism 50X (see FIG. 4 through FIG. 7). Illumination lights are then reflected on the reflection mirror 52 to go incident on the rotating prism 50Y. Because the rotating prism 50Y rotates about the rotating axis 51Y that is parallel to the Z axis in the drawing, illumination lights pass through the rotating prism 50Y while the optical axis is shifted in parallel in the Y-axis direction due to the relation with a rotating angle and a refractive index of the rotating prism 50Y (see FIG. 4 through FIG. 7).

Illumination lights emitted from the rotating prism 50Y are irradiated to the light incident end face (display region) of the liquid crystal light valve 80, which is the subject to be illuminated, by means of the relay lenses 65 and 70 and the parallelizing lens 75. As are shown in FIG. 11 and FIG. 12, an image of the illumination band 85, which is an image of the variable aperture 31xy, is formed on the light incident end face (display region) of the liquid crystal light valve 80. The illumination band 85 is scanned in the X-axis direction by the rotating prism 50X, and is scanned in the Y-axis direction by the rotating prism 50Y (FIG. 11).

Because the functions and effects are the same as those of the first embodiment once the illumination lights come incident on the liquid crystal light valve 80, descriptions thereof are omitted.

According to the configuration described above, the illumination band 85 on the liquid crystal light valve 80 can change in length in the X-axis direction and in the Y-axis direction in FIG. 11. Hence, when the projection type display device 130 is to display images in fast motion, a characteristic closer to a display by the so-called impulse type can be achieved by further narrowing the illumination band 85 by bringing the paired light shielding plates 30a and the paired light shielding plates 30b, respectively, in the variable aperture reflection slits 30X and 30Y into close proximity to each other, which enables moving images with a higher quality to be displayed.

Figure 12:
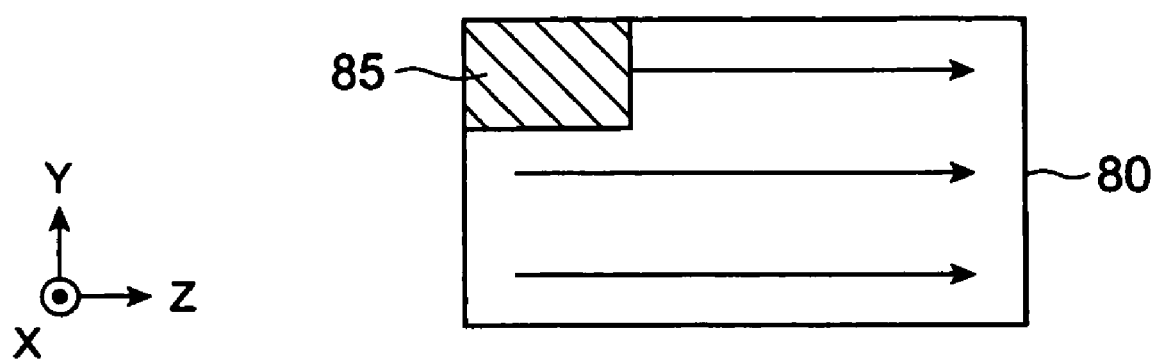
FIG. 12 is a view specifying a scanning direction of an illumination band in the projection type display device according to the third exemplary embodiment.

Also, by rotating the two rotating prisms 50X and 50Y, it is possible to scan illumination lights emitted from the light source 10 on the liquid crystal light valve 80 in the Z-axis direction and in the Y-axis direction in FIG. 12. Also, by controlling rotations of the rotating prisms 50X and 50Y independently, it is possible to control scanning of the illumination band 85 separately in the Z-axis direction and in the Y-axis direction in the drawing. The illumination band 85 can be thus scanned in various patterns, for example, by making scanning speeds in the Z-axis direction and in the Y-axis direction different, which is effective in improving the quality of moving images.

A fourth exemplary embodiment of the invention will now be described with reference to FIG. 13 and FIG. 14.

Figure 13:
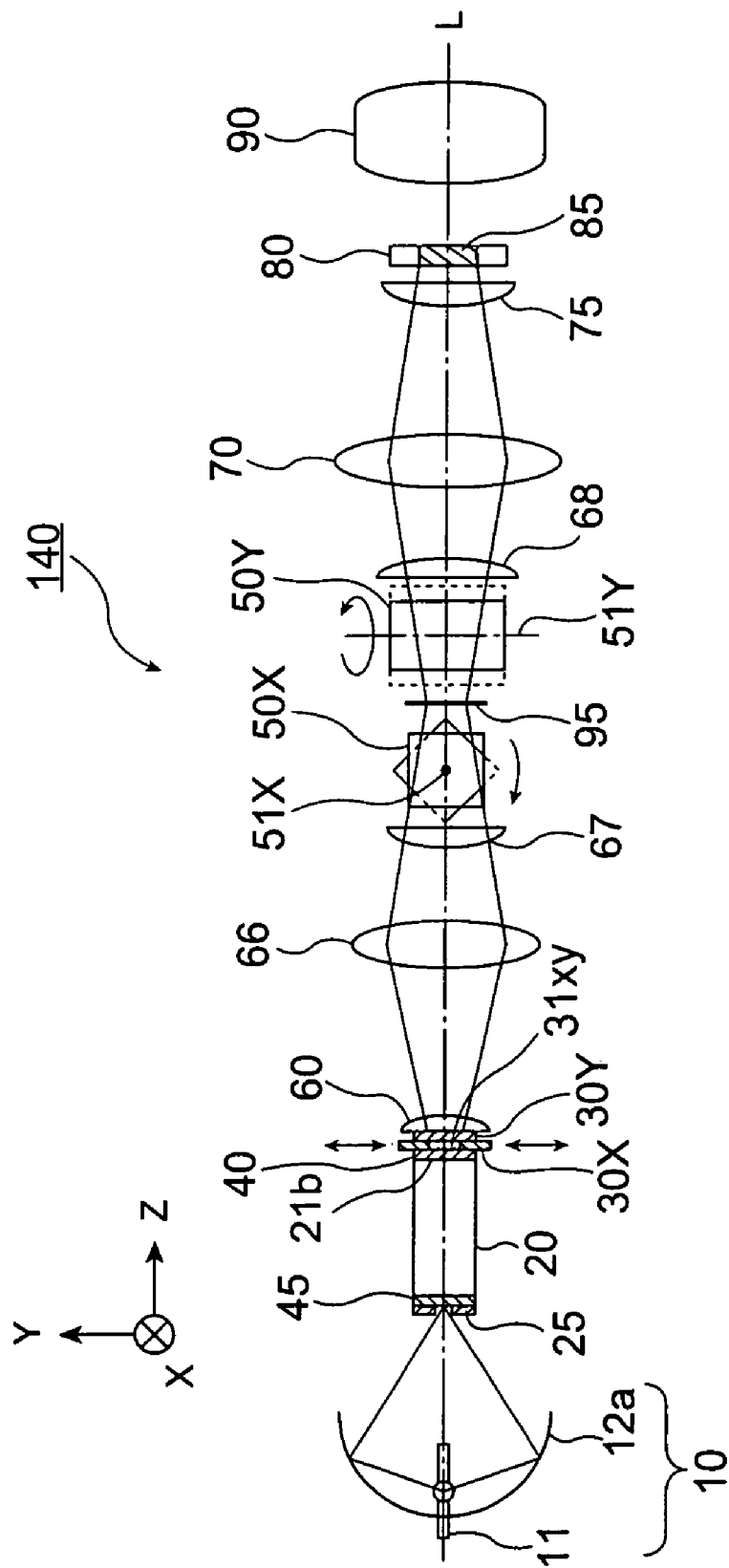
FIG. 13 is a schematic view of a projection type display device according to a fourth exemplary embodiment of the invention.

A projection type display device 140 in this embodiment is different from the counterpart in the third embodiment in that, as is shown in FIG. 13, two rotating prisms 50X and 50Y are disposed in close proximity to each other on the optical axis L that extends linearly. Lights (illumination lights) emitted through the variable aperture 31xy in the rod lens 20 are transmitted to the vicinity of a conjugate position 95 by way of the rotating prism 50X by a first relay system comprising a light incident-side lens 60, a relay lens 66, and a light exiting-side lens 67, and transmitted further onto a liquid crystal light valve 80 (subject to be illuminated) by way of the rotating prism 50Y by a second relay system comprising a light incident-side lens 68, a relay lens 70, and a light exiting-side lens 75. Hence, the variable aperture 31xy and the conjugate position 95 as well as the conjugate position 95 and the liquid crystal light valve 80 establish optically conjugate positional relations with each other. It is preferable that the two rotating prisms 50X and 50Y are disposed in closest possible proximity to each other with the conjugate position in between.

As to precise and efficient scanning of an illumination band, it is preferable to dispose rotating prisms in closest possible proximity to a superimposing position (or an optically conjugate position with the same) of (partial) lights because in this case the occurrence of optical aberration can be reduced. For example, referring to FIG. 1 of the first embodiment, it is preferable to dispose the rotating prism 50 to the variable aperture 31 in the rod lens 20, which is, however, physically infeasible. The rotating prism 50, therefore, is disposed in close proximity to the variable aperture 31. Also, referring to FIG. 10 of the second embodiment, the rotating prism 50 is disposed at the conjugate position generated by additionally providing the relay system. Hence, according to the configuration in FIG. 13 of this embodiment, because the two rotating prisms 50X and 50Y can be disposed in close proximity to each other with the conjugate position 95 in between, the occurrence of optical aberration can be readily reduced, which in turn enables illumination lights to be scanned precisely and efficiently. As a result of disposing the two rotating prisms 50X and 50Y in close proximity to each other, there can be achieved an advantage that the dimension in the length direction of the rotating prism 50Y in the latter stage (the length in a direction corresponding to the scanning direction of illumination lights by the rotating prism 50X in the former stage (Y-axis direction in FIG. 13)) can be smaller.

Further, configurations as follows can be adopted as modifications of this embodiment.

By disposing a new optical element at the conjugate position 95 to compensate for optical aberration upon transmission of lights, it can be possible to enhance efficiency of transmission and to shape the illumination band on the subject to be illuminated. As the optical element, a spherical lens, an aspherical lens, a wave front compensator, etc. can be used. Further, by introducing the new optical element, the lens 67 and the lens 68 can be omitted.

A light shielding slit to shape the illumination band may be disposed at the conjugate position 95. In this case, a loss of lights occurs, but an illumination band of a desired shape can be obtained.

A method of 2-D scanning of the illumination band in this embodiment will now be described. The scanning can be performed also in the third embodiment according to the method as follows.

Line-sequential writing is typical as a method of writing image data into a liquid crystal light valve in which plural pixels are disposed in a matrix fashion. To be more specific, image writing for one screen (frame) is completed by repeating the procedure to select an array of pixels in the X direction (row direction) to write one line of image information into the array of pixels thus selected, and the procedure to select a new array of pixels adjacent to the array of pixels selected earlier to write one line of image information into the newly selected array of pixels, and so forth. To select an array of pixels in one row aligned in the X direction, a vertical synchronizing signal is used as a timing signal.

Figure 14:
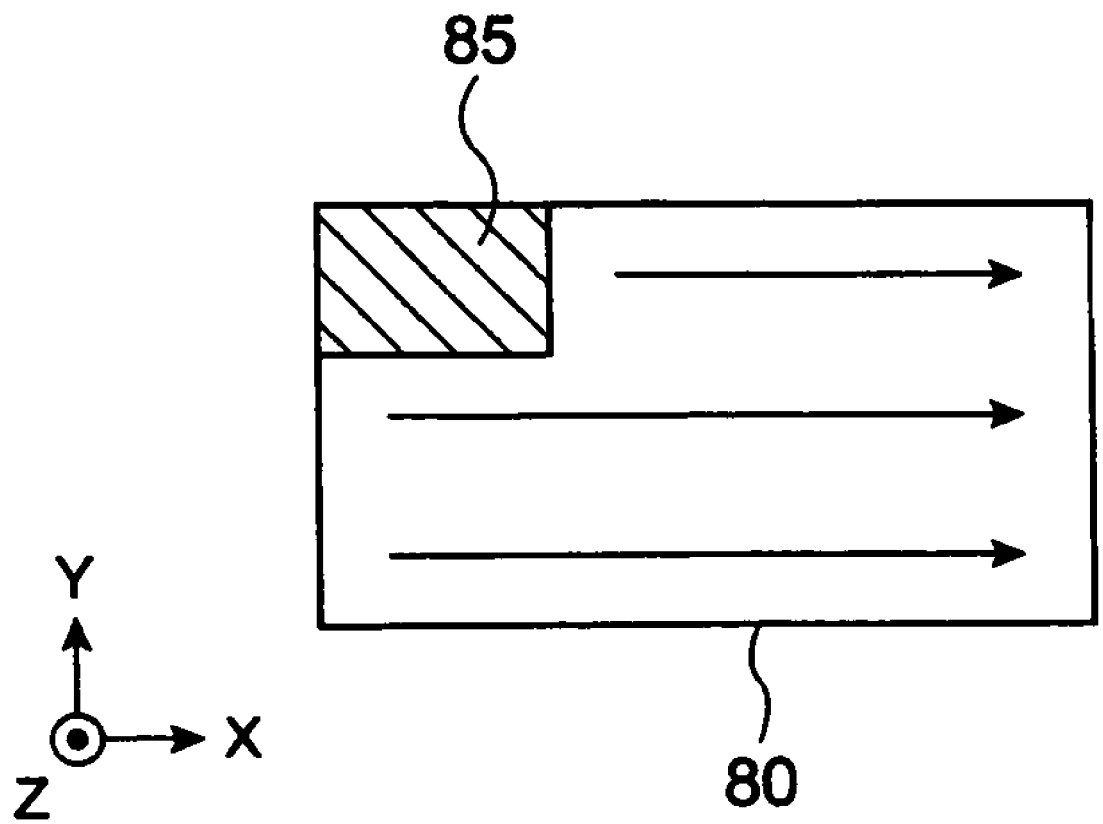
FIG. 14 is a view specifying a scanning direction of an illumination band in the projection type display device according to the fourth exemplary embodiment.

As is shown in FIG. 14, when the illumination band 85 is scanned on a 2-D plane, illumination by scanning across the entire display region of the liquid crystal light valve is eventually achieved by repeating the procedure to set the scanning position of the illumination band 85 in the Y-axis direction by holding one rotating prism 50Y at rest after it is rotated by a specific rotating angle using a vertical synchronizing signal as a timing signal, and the procedure to rotate the other rotating prism 50X for the illumination band 85 to be scanned in the X-axis direction, and so forth. The rotating operations of one rotating prism 50Y are therefore intermittent, while the rotating operations of the other rotating prism 50X are intermittent or continuous (In the case of continuous rotations, a scanning method by which, for example, the scan range of the other rotating prism 50X is set to a range longer by the full width of the display region of the liquid crystal light valve, while one rotating prism 50Y is rotated by using a period during which no illumination lights are irradiated to the display region, may be adopted). In addition, it is preferable to configure in a such a manner that the rotating operations of the other rotating prism 50X are controlled on the basis of the information (for example, information to rotate or stop) of one rotating prism 50Y.

It should be understood that the technical scope of the invention is not limited to the exemplary embodiments above, and various modifications can be added without deviating from the scope of the invention.

For example, the embodiments above were described on the assumption that the invention is applied to a projection type display device. However, it should be understood that the invention is not limited to the projection type display device, and can be applied to various types of display devices using a light valve having a hold type display mode (not provided with projecting means), such as a direct-view type display device using a liquid crystal light valve.

Also, when a light valve having a hold type display mode, a projection lens, etc. are configured separately, the invention can be also applied as an illumination device to illuminate the light valve or the like.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An illumination device, comprising:
a light source to emit lights;
a homogeneous light guiding device that makes intensity distributions of the lights emitted from the light source homogeneous;
a reflecting device, that is disposed on a light incident end face side of the homogeneous light guiding device and that is provided with an aperture to allow the lights to enter the homogenous light guiding device that reflects lights emitted from the homogenous light guiding device to an inside of the homogenous light guiding device in a region other than the aperture;
a reflection variable diaphragm device, that is disposed on a light exiting end face side of the homogenous light guiding device, that forms a variable aperture in which an area of an aperture region that allows lights to be emitted from the homogeneous light guiding device varies, and, in a region other than the aperture region, reflects the lights emitted from the homogeneous light guiding device to the inside of said homogeneous light guiding device; and
a light scanning device that scans lights emitted from the reflection variable diaphragm device on a subject to be illuminated.

2. The illumination device according to claim 1,
a shape of the light exiting end face of the homogenous light guiding device being similar to a shape of a subject to be illuminated.

3. The illumination device according to claim 1,
an aperture shape of the variable aperture being controlled to be a specific shape; and
the light scanning device illuminating the subject to be illuminated without scanning the lights.

4. The illuminating device according to claim 1,
the reflection variable diaphragm device including a pair of light shielding plates disposed to come in close proximity to and to be spaced apart from each other; and
a direction in which a width of the lights on a subject to be illuminated is changed by the pair of light shielding plates being substantially a same direction as a scanning direction of the lights on the subject to be illuminated by said light scanning device.

5. The illumination device according to any of claim 1,
the light scanning device including a rotating prism to scan the lights by changing a position of an optical path through its own rotations.

6. The illumination device according to claim 1,
the reflection variable diaphragm device including two pairs of light shielding plates disposed to come in close proximity to and to be spaced apart from each other;
directions, in which respective pairs of light shielding plates come in close proximity to and to be spaced apart from each other, intersecting with each other almost at right angles; and a direction in which a width of the lights on a subject to be illuminated is changed by the two pairs of light shielding plates being substantially a same direction as a scanning direction of the lights on said subject to be illuminated by the light scanning device.

7. The illumination device according to claim 6, light scanning device including two rotating prisms to scan the lights by changing positions of the lights through their own rotations; and rotating axes of the rotating prisms being disposed to intersect with each other almost at right angles.

8. The illumination device according to claim 1, the light scanning device being disposed to be inserted into or removed from a path of the lights.

9. The illumination device according to claim 1, a reflection type polarizing device being provided on the light exiting end face side of the homogeneous light guiding device.

10. The illumination device according to claim 1, a $\lambda/4$ wave plate being provided between the reflecting device and the reflection variable diaphragm device.

11. The illumination device according to claim 1, the light scanning device being disposed in a region in close proximity to the light exiting end face of the homogeneous light guiding device.

12. The illumination device according to claim 1, the light scanning device being disposed in an optically conjugate region with the variable aperture in the reflection variable diaphragm device.

13. The illumination device according to claim 1, the light scanning device being disposed in a region in close proximity to an optically conjugate region with the variable aperture in the reflection variable diaphragm device.

14. The illumination device according to claim 1, the light scanning device including two rotating prisms, and the two rotating prisms being disposed, respectively, at two points before and after an optically conjugate position with the variable aperture in the reflection variable diaphragm device.

15. The illumination device according to claim 14, an optical element that compensates for optical aberration upon transmission of the lights or that shapes the illumination lights being disposed at an optically conjugate position with the variable aperture in the reflection variable diaphragm device.

16. A display device, including:

a light source that emits lights and a light modulating device that modulates the lights from the light source; and the light source being the illumination device according to claim 1.

17. The illumination device according to claim 16, the light source and the reflection variable diaphragm device being controlled according an image signal inputted into the display device.

18. A projection type display device, including:

a light source that emits lights;

a light modulating device to modulate the lights emitted from the light source;

a projection device that projects lights modulated by the light modulating device; and the light source being the illumination device according to claim 1.

19. The projection type display device according to claim 18, the light source and the reflection variable diaphragm device being controlled according an image signal inputted into the projection type display device.

\* \* \* \* \*